US011983462B2

(12) United States Patent
Assa et al.

(10) Patent No.: US 11,983,462 B2
(45) Date of Patent: May 14, 2024

(54) CONVERSATION GUIDED AUGMENTED REALITY EXPERIENCE

(71) Applicant: Snap Inc., Santa Monica, CA (US)

(72) Inventors: Jackie Assa, Herzliya (IL); Alan Bekker, Givaat Shmuel (IL); Gilad Landau, Herzliya (IL)

(73) Assignee: SNAP INC., Santa Monica, CA (US)

( * ) Notice: Subject to any disclaimer, the term of this patent is extended or adjusted under 35 U.S.C. 154(b) by 322 days.

(21) Appl. No.: 17/446,513

(22) Filed: Aug. 31, 2021

(65) Prior Publication Data

US 2023/0067305 A1 Mar. 2, 2023

(51) Int. Cl.
*G06F 3/16* (2006.01)
*G06F 3/01* (2006.01)
(Continued)

(52) U.S. Cl.
CPC .............. *G06F 3/167* (2013.01); *G06F 3/011* (2013.01); *G06N 3/02* (2013.01); *G06Q 30/0643* (2013.01);
(Continued)

(58) Field of Classification Search
CPC ........ G06F 3/167; G06F 3/011; G06F 40/295; G06F 40/30; G06N 3/02; G06N 3/08;
(Continued)

(56) References Cited

U.S. PATENT DOCUMENTS 5,604,843 A 2/1997 Shaw et al.
5,689,559 A 11/1997 Park
(Continued)

FOREIGN PATENT DOCUMENTS

CN 109863532 A 6/2019
CN 110168478 A 8/2019
(Continued)

OTHER PUBLICATIONS

"International Application Serial No. PCT/US2022/075510, International Search Report dated Dec. 15, 2022", 4 pgs.
(Continued)

*Primary Examiner* — Yogeshkumar Patel
(74) *Attorney, Agent, or Firm* — SCHWEGMAN LUNDBERG & WOESSNER, P.A.

(57) ABSTRACT

Systems and methods are provided for providing an augmented reality experience. The systems and methods perform operations comprising: generating, for display by a messaging application, an image comprising one or more augmented reality elements, the one or more augmented reality elements being associated with a configurable entity; receiving, by the messaging application, speech input from a user; determining a schema associated with the one or more augmented reality elements; causing the speech input to be processed by a speech understanding model in accordance with the schema to determine one or more configurable state entity update values; updating the configurable entity associated with the one or more augmented reality elements based on the one or more configurable state entity update values; and modifying the one or more augmented reality elements in the image based on the updated configurable entity.

20 Claims, 12 Drawing Sheets

(51) Int. Cl.
*G06N 3/02* (2006.01)
*G06Q 30/0601* (2023.01)
*G10L 15/16* (2006.01)
*G10L 15/22* (2006.01)

(52) U.S. Cl.
CPC .............. *G10L 15/16* (2013.01); *G10L 15/22* (2013.01); *G10L 2015/223* (2013.01); *G10L 2015/225* (2013.01)

(58) Field of Classification Search
CPC .... G06N 3/044; G06N 3/045; G06Q 30/0643; G06Q 10/101; G06Q 50/01; G10L 15/16; G10L 15/22; G10L 2015/223; G10L 2015/225; G10L 15/1822; G06T 19/006; G06T 13/40; G06T 2210/16
See application file for complete search history.

(56) References Cited

U.S. PATENT DOCUMENTS 5,880,731 A 3/1999 Liles et al.
6,023,270 A 2/2000 Brush, II et al.
RE36,919 E 10/2000 Park
RE37,052 E 2/2001 Park
6,223,165 B1 4/2001 Lauffer
6,650,793 B1 11/2003 Lund et al.
6,772,195 B1 8/2004 Hatlelid et al.
6,804,417 B1 10/2004 Lund et al.
6,842,779 B1 1/2005 Nishizawa
7,342,587 B2 3/2008 Danzig et al.
7,468,729 B1 12/2008 Levinson
7,636,755 B2 12/2009 Blattner et al.
7,639,251 B2 12/2009 Gu et al.
7,775,885 B2 8/2010 Van Luchene et al.
7,859,551 B2 12/2010 Bulman et al.
7,885,931 B2 2/2011 Seo et al.
7,925,703 B2 4/2011 Dinan et al.
8,088,044 B2 1/2012 Tchao et al.
8,095,878 B2 1/2012 Bates et al.
8,108,774 B2 1/2012 Finn et al.
8,117,281 B2 2/2012 Robinson et al.
8,130,219 B2 3/2012 Fleury et al.
8,146,005 B2 3/2012 Jones et al.
8,151,191 B2 4/2012 Nicol
RE43,993 E 2/2013 Park
8,384,719 B2 2/2013 Reville et al.
RE44,054 E 3/2013 Kim
RE44,068 E 3/2013 Park
RE44,106 E 3/2013 Park
8,396,708 B2 3/2013 Park et al.
RE44,121 E 4/2013 Park
8,425,322 B2 4/2013 Gillo et al.
8,458,601 B2 6/2013 Castelli et al.
8,462,198 B2 6/2013 Lin et al.
8,484,158 B2 7/2013 Deluca et al.
8,495,503 B2 7/2013 Brown et al.
8,495,505 B2 7/2013 Smith et al.
8,504,926 B2 8/2013 Wolf
8,559,980 B2 10/2013 Pujol
8,564,621 B2 10/2013 Branson et al.
8,564,710 B2 10/2013 Nonaka et al.
8,581,911 B2 11/2013 Becker et al.
8,597,121 B2 12/2013 del Valle
8,601,051 B2 12/2013 Wang
8,601,379 B2 12/2013 Marks et al.
8,632,408 B2 1/2014 Gillo et al.
8,648,865 B2 2/2014 Dawson et al.
8,659,548 B2 2/2014 Hildreth
8,683,354 B2 3/2014 Khandelwal et al.
8,692,830 B2 4/2014 Nelson et al.
8,810,513 B2 8/2014 Ptucha et al.
8,812,171 B2 8/2014 Filev et al.
8,832,201 B2 9/2014 Wall
8,832,552 B2 9/2014 Arrasvuori et al.
8,839,327 B2 9/2014 Amento et al.
8,890,926 B2 11/2014 Tandon et al.
8,892,999 B2 11/2014 Nims et al.
8,924,250 B2 12/2014 Bates et al.
8,963,926 B2 2/2015 Brown et al.
8,989,786 B2 3/2015 Feghali
9,086,776 B2 7/2015 Ye et al.
9,105,014 B2 8/2015 Collet et al.
9,241,184 B2 1/2016 Weerasinghe
9,256,860 B2 2/2016 Herger et al.
9,298,257 B2 3/2016 Hwang et al.
9,314,692 B2 4/2016 Konoplev et al.
9,330,483 B2 5/2016 Du et al.
9,349,218 B2 5/2016 Keating et al.
9,357,174 B2 5/2016 Li et al.
9,361,510 B2 6/2016 Yao et al.
9,378,576 B2 6/2016 Bouaziz et al.
9,402,057 B2 7/2016 Kaytaz et al.
9,412,192 B2 8/2016 Mandel et al.
9,460,541 B2 10/2016 Li et al.
9,489,760 B2 11/2016 Li et al.
9,503,845 B2 11/2016 Vincent
9,508,197 B2 11/2016 Quinn et al.
9,532,364 B2 12/2016 Fujito
9,544,257 B2 1/2017 Ogundokun et al.
9,576,400 B2 2/2017 Van Os et al.
9,589,357 B2 3/2017 Li et al.
9,592,449 B2 3/2017 Barbalet et al.
9,648,376 B2 5/2017 Chang et al.
9,697,635 B2 7/2017 Quinn et al.
9,706,040 B2 7/2017 Kadirvel et al.
9,744,466 B2 8/2017 Fujioka
9,746,990 B2 8/2017 Anderson et al.
9,749,270 B2 8/2017 Collet et al.
9,792,714 B2 10/2017 Li et al.
9,839,844 B2 12/2017 Dunstan et al.
9,883,838 B2 2/2018 Kaleal, III et al.
9,898,849 B2 2/2018 Du et al.
9,911,073 B1 3/2018 Spiegel et al.
9,936,165 B2 4/2018 Li et al.
9,959,037 B2 5/2018 Chaudhri et al.
9,980,100 B1 5/2018 Charlton et al.
9,990,373 B2 6/2018 Fortkort
10,039,988 B2 8/2018 Lobb et al.
10,097,492 B2 10/2018 Tsuda et al.
10,116,598 B2 10/2018 Tucker et al.
10,155,168 B2 12/2018 Blackstock et al.
10,158,589 B2 12/2018 Collet et al.
10,242,477 B1 3/2019 Charlton et al.
10,242,503 B2 3/2019 McPhee et al.
10,262,250 B1 4/2019 Spiegel et al.
10,348,662 B2 7/2019 Baldwin et al.
10,362,219 B2 7/2019 Wilson et al.
10,432,559 B2 10/2019 Baldwin et al.
10,454,857 B1 10/2019 Blackstock et al.
10,475,225 B2 11/2019 Park et al.
10,504,266 B2 12/2019 Blattner et al.
10,573,048 B2 2/2020 Ni et al.
10,656,797 B1 5/2020 Alvi et al.
10,657,695 B2 5/2020 Chand et al.
10,657,701 B2 5/2020 Osman et al.
10,762,174 B2 9/2020 Denton et al.
10,805,248 B2 10/2020 Luo et al.
10,872,451 B2 12/2020 Sheth et al.
10,880,246 B2 12/2020 Baldwin et al.
10,895,964 B1 1/2021 Grantham et al.
10,896,534 B1 1/2021 Smith et al.
10,933,311 B2 3/2021 Brody et al.
10,938,758 B2 3/2021 Allen et al.
10,964,082 B2 3/2021 Amitay et al.
10,979,752 B1 4/2021 Brody et al.
10,984,575 B2 4/2021 Assouline et al.
10,992,619 B2 4/2021 Antmen et al.
11,010,022 B2 5/2021 Alvi et al.
11,030,789 B2 6/2021 Chand et al.
11,036,781 B1 6/2021 Baril et al.
11,063,891 B2 7/2021 Voss
11,069,103 B1 7/2021 Blackstock et al.
11,080,917 B2 8/2021 Monroy-hernández et al.

(56) References Cited

U.S. PATENT DOCUMENTS

| | | | |
|---|---|---|---|
| 11,128,586 | B2 | 9/2021 | Al Majid et al. |
| 11,188,190 | B2 | 11/2021 | Blackstock et al. |
| 11,189,070 | B2 | 11/2021 | Jahangiri et al. |
| 11,199,957 | B1 | 12/2021 | Alvi et al. |
| 11,218,433 | B2 | 1/2022 | Baldwin et al. |
| 11,229,849 | B2 | 1/2022 | Blackstock et al. |
| 11,245,658 | B2 | 2/2022 | Grantham et al. |
| 11,249,614 | B2 | 2/2022 | Brody |
| 11,263,254 | B2 | 3/2022 | Baril et al. |
| 11,270,491 | B2 | 3/2022 | Monroy-Hernández et al. |
| 11,284,144 | B2 | 3/2022 | Kotsopoulos et al. |
| 2002/0067362 | A1 | 6/2002 | Agostino Nocera et al. |
| 2002/0169644 | A1 | 11/2002 | Greene |
| 2005/0162419 | A1 | 7/2005 | Kim et al. |
| 2005/0206610 | A1 | 9/2005 | Cordelli |
| 2006/0294465 | A1 | 12/2006 | Ronen et al. |
| 2007/0113181 | A1 | 5/2007 | Blattner et al. |
| 2007/0168863 | A1 | 7/2007 | Blattner et al. |
| 2007/0176921 | A1 | 8/2007 | Iwasaki et al. |
| 2008/0071559 | A1 | 3/2008 | Arrasvuori |
| 2008/0158222 | A1 | 7/2008 | Li et al. |
| 2009/0016617 | A1 | 1/2009 | Bregman-amitai et al. |
| 2009/0055484 | A1 | 2/2009 | Vuong et al. |
| 2009/0070688 | A1 | 3/2009 | Gyorfi et al. |
| 2009/0099925 | A1 | 4/2009 | Mehta et al. |
| 2009/0106672 | A1 | 4/2009 | Burstrom |
| 2009/0158170 | A1 | 6/2009 | Narayanan et al. |
| 2009/0177976 | A1 | 7/2009 | Bokor et al. |
| 2009/0202114 | A1 | 8/2009 | Morin et al. |
| 2009/0265604 | A1 | 10/2009 | Howard et al. |
| 2009/0300525 | A1 | 12/2009 | Jolliff et al. |
| 2009/0303984 | A1 | 12/2009 | Clark et al. |
| 2010/0011422 | A1 | 1/2010 | Mason et al. |
| 2010/0023885 | A1 | 1/2010 | Reville et al. |
| 2010/0115426 | A1 | 5/2010 | Liu et al. |
| 2010/0162149 | A1 | 6/2010 | Sheleheda et al. |
| 2010/0203968 | A1 | 8/2010 | Gill et al. |
| 2010/0227682 | A1 | 9/2010 | Reville et al. |
| 2011/0093780 | A1 | 4/2011 | Dunn |
| 2011/0115798 | A1 | 5/2011 | Nayar et al. |
| 2011/0148864 | A1 | 6/2011 | Lee et al. |
| 2011/0239136 | A1 | 9/2011 | Goldman et al. |
| 2012/0113106 | A1 | 5/2012 | Choi et al. |
| 2012/0124458 | A1 | 5/2012 | Cruzada |
| 2012/0130717 | A1 | 5/2012 | Xu et al. |
| 2013/0103760 | A1 | 4/2013 | Golding et al. |
| 2013/0201187 | A1 | 8/2013 | Tong et al. |
| 2013/0249948 | A1 | 9/2013 | Reitan |
| 2013/0257877 | A1 | 10/2013 | Davis |
| 2014/0043329 | A1 | 2/2014 | Wang et al. |
| 2014/0055554 | A1 | 2/2014 | Du et al. |
| 2014/0100997 | A1 | 4/2014 | Mayerle et al. |
| 2014/0125678 | A1 | 5/2014 | Wang et al. |
| 2014/0129343 | A1 | 5/2014 | Finster et al. |
| 2015/0206349 | A1 | 7/2015 | Rosenthal et al. |
| 2016/0134840 | A1 | 5/2016 | Mcculloch |
| 2016/0234149 | A1 | 8/2016 | Tsuda et al. |
| 2017/0080346 | A1 | 3/2017 | Abbas |
| 2017/0087473 | A1 | 3/2017 | Siegel et al. |
| 2017/0113140 | A1 | 4/2017 | Blackstock et al. |
| 2017/0118145 | A1 | 4/2017 | Aittoniemi et al. |
| 2017/0199855 | A1 | 7/2017 | Fishbeck |
| 2017/0235848 | A1 | 8/2017 | Van Deusen et al. |
| 2017/0310934 | A1 | 10/2017 | Du et al. |
| 2017/0312634 | A1 | 11/2017 | Ledoux et al. |
| 2018/0047200 | A1 | 2/2018 | O'hara et al. |
| 2018/0113587 | A1 | 4/2018 | Allen et al. |
| 2018/0115503 | A1 | 4/2018 | Baldwin et al. |
| 2018/0198743 | A1 | 7/2018 | Blackstock et al. |
| 2018/0315076 | A1 | 11/2018 | Andreou |
| 2018/0315133 | A1 | 11/2018 | Brody et al. |
| 2018/0315134 | A1 | 11/2018 | Amitay et al. |
| 2019/0001223 | A1 | 1/2019 | Blackstock et al. |
| 2019/0057616 | A1 | 2/2019 | Cohen et al. |
| 2019/0097958 | A1 | 3/2019 | Collet et al. |
| 2019/0179405 | A1 | 6/2019 | Sun et al. |
| 2019/0188920 | A1 | 6/2019 | Mcphee et al. |
| 2019/0280997 | A1 | 9/2019 | Baldwin et al. |
| 2019/0332400 | A1* | 10/2019 | Spoor .................... G06F 3/013 |
| 2020/0285464 | A1* | 9/2020 | Brebner ................ G06F 11/362 |
| 2020/0306637 | A1 | 10/2020 | Baldwin et al. |
| 2020/0372127 | A1 | 11/2020 | Denton et al. |
| 2020/0410575 | A1 | 12/2020 | Grantham et al. |
| 2021/0074047 | A1 | 3/2021 | Sheth et al. |
| 2021/0089179 | A1 | 3/2021 | Grantham et al. |
| 2021/0104087 | A1 | 4/2021 | Smith et al. |
| 2021/0168108 | A1 | 6/2021 | Antmen et al. |
| 2021/0170270 | A1 | 6/2021 | Brody et al. |
| 2021/0192823 | A1 | 6/2021 | Amitay et al. |
| 2021/0209825 | A1 | 7/2021 | Assouline et al. |
| 2021/0225058 | A1 | 7/2021 | Chand et al. |
| 2021/0240315 | A1 | 8/2021 | Alvi et al. |
| 2021/0243482 | A1 | 8/2021 | Baril et al. |
| 2021/0243503 | A1 | 8/2021 | Kotsopoulos et al. |
| 2021/0266277 | A1 | 8/2021 | Allen et al. |
| 2021/0281897 | A1 | 9/2021 | Brody et al. |
| 2021/0285774 | A1 | 9/2021 | Collins et al. |
| 2021/0306290 | A1 | 9/2021 | Voss |
| 2021/0306451 | A1 | 9/2021 | Heikkinen et al. |
| 2021/0383796 | A1* | 12/2021 | Coucke .................. G10L 15/22 |
| 2021/0385180 | A1 | 12/2021 | Al Majid et al. |
| 2021/0405831 | A1 | 12/2021 | Mourkogiannis et al. |
| 2021/0409535 | A1 | 12/2021 | Mourkogiannis et al. |
| 2022/0012929 | A1 | 1/2022 | Blackstock et al. |

FOREIGN PATENT DOCUMENTS

| | | | |
|---|---|---|---|
| EP | 2184092 | A2 | 5/2010 |
| JP | 2001230801 | A | 8/2001 |
| JP | 5497931 | B2 | 3/2014 |
| KR | 101445263 | B1 | 9/2014 |
| WO | 0250649 | | 6/2002 |
| WO | WO-2003094072 | A1 | 11/2003 |
| WO | WO-2004095308 | A1 | 11/2004 |
| WO | WO-2006107182 | A1 | 10/2006 |
| WO | WO-2007134402 | A1 | 11/2007 |
| WO | WO-2012139276 | A1 | 10/2012 |
| WO | WO-2013027893 | A1 | 2/2013 |
| WO | WO-2013152454 | A1 | 10/2013 |
| WO | WO-2013166588 | A1 | 11/2013 |
| WO | WO-2014031899 | A1 | 2/2014 |
| WO | WO-2014194439 | A1 | 12/2014 |
| WO | WO-2016090605 | A1 | 6/2016 |
| WO | WO-2018081013 | A1 | 5/2018 |
| WO | WO-2018102562 | A1 | 6/2018 |
| WO | WO-2018129531 | A1 | 7/2018 |
| WO | WO-2019089613 | A1 | 5/2019 |
| WO | 2023034722 | | 3/2023 |

OTHER PUBLICATIONS

"International Application Serial No. PCT/US2022/075510, Written Opinion dated Dec. 15, 2022", 7 pgs.

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

(56) References Cited

OTHER PUBLICATIONS

"Manage Your Bitmoji", Snapchat Support, [Online] Retrieved from the Internet: <URL: https://web.archive.org/web/20190503063620/ https://support.snapchat.com/en-US/a/manage-bitmoji>, (captured May 3, 2019), 3 pgs.
"Your Own Personal Emoji", Bitstrips Inc, [Online] Retrieved from the Internet: <URL: https://web.archive.org/web/20150205232004/ http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.
MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/ snapchat-friendship-profiles-bitmoji-merchandise-comics>, (Nov. 13, 2018), 5 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/ 1/30/16949402/bitmoji-deluxe-snapchat-customization>, (Jan. 30, 2018), 2 pgs.
Reign, Ashley, "How To Add My Friend's Bitmoji To My Snapchat", Women.com, [Online] Retrieved from the Internet: <URL: https:// www.women.com/ashleyreign/lists/how-to-add-my-friends-bitmoji-to-my-snapchat>, (Jun. 30, 2017), 7 pgs.
Tumbokon, Karen, "Snapchat Update: How To Add Bitmoji To Customizable Geofilters", International Business Times, [Online] Retrieved from the Internet : <URL: https://www.ibtimes.com/ snapchat-update-how-add-bitmoji-customizable-geofilters-2448152>, (Nov. 18, 2016), 6 pgs.

* cited by examiner

610

FIRST CONFIGURABLE ENTITY TYPE 612 614

| Pitch | Gender | Distortion | Type |
|---|---|---|---|
| High | Male | Alien | Bass |
| Low | Female | Squeeky | Soprano |
| | Undefined | | |

620

SECOND CONFIGURABLE ENTITY TYPE 622 624

| Color | Lens Type | Frame Shape | Type |
|---|---|---|---|
| Black | Transparent | Round | Sun Glasses |
| Red | Opaque | Square | Reading Glasses |
| Yellow | | | |

FIG. 6A

CONVERSATION GUIDED AUGMENTED REALITY EXPERIENCE

TECHNICAL FIELD

The present disclosure generally relates to the technical field of social networks. In particular, the present examples are generally directed to providing augmented reality experiences.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 6A and 6B are diagrammatic representations of data structures of the conversation-based AR system, in accordance with some examples.

DETAILED DESCRIPTION

Figure 1:
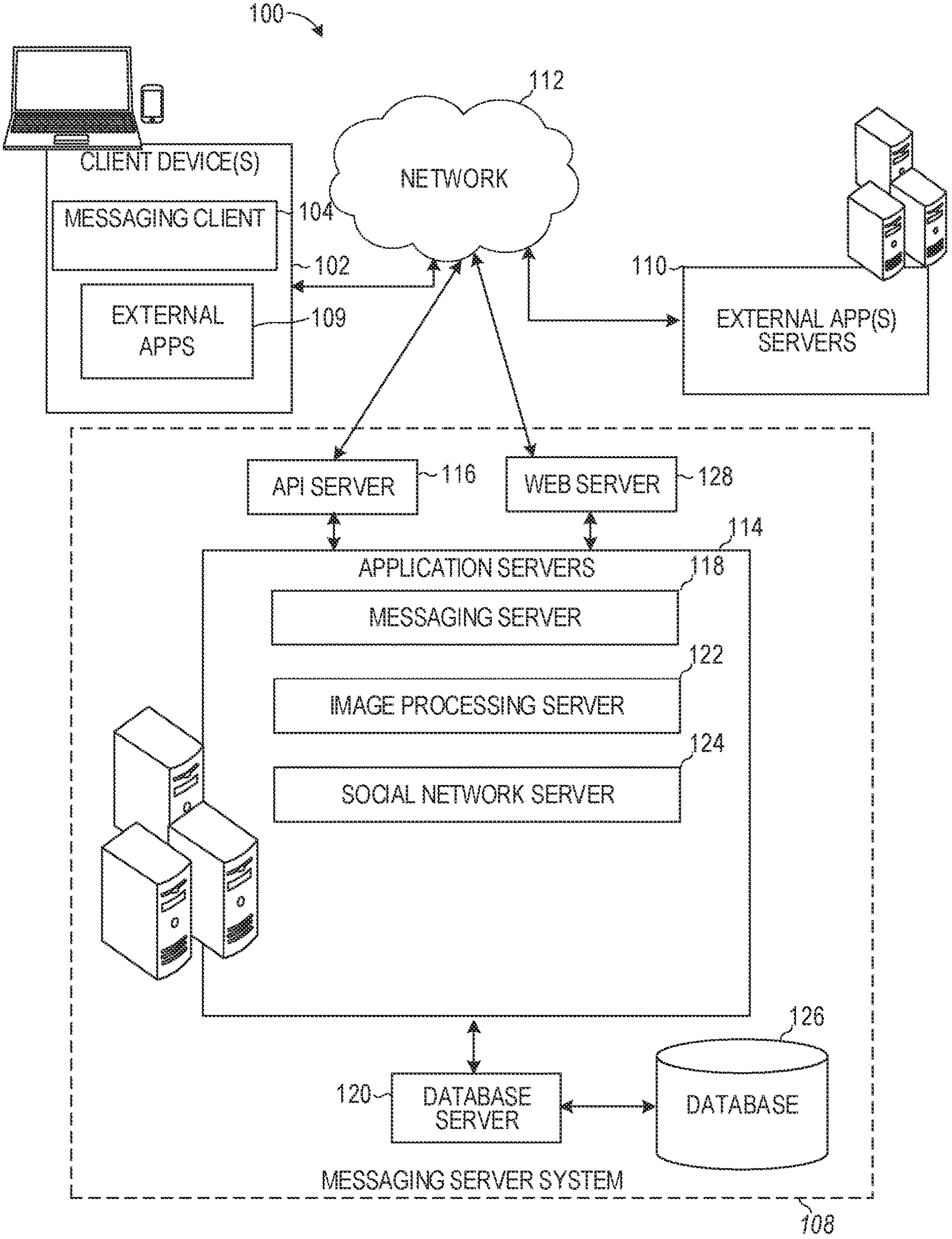
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, virtual reality (VR) and augmented reality (AR) systems display images depicting a given user by capturing an image of the user and, in addition, obtaining a depth map using a depth sensor of the real-world human body depicted in the image. By processing the depth map and the image together, the VR and AR systems can detect positioning of a user in the image and can appropriately add augmented reality elements to the depiction of the user in the images. Such systems allow a user to control the display and modification of the augmented reality elements by manually adjusting such elements or selecting between various on-screen options. While such systems work well, the need to have the user physically and manually interact with the systems limits their overall appeal and makes the experience less interesting and engaging.

Certain systems do away with the need to receive physical or manual interaction to modify images. For example, certain systems allow users to provide one of several predetermined commands verbally, such as capture, delete, set color, and so forth. However, in these systems, the users have to know ahead of time what exact commands can be provided verbally. Namely, the users have to spend time learning the exact format and type of commands they can issue verbally which takes time and effort and takes away from the appeal of controlling the augmented reality systems verbally. Also, in these systems the user has to learn, for each type of augmented reality experience, the exact types of verbal commands that can be input, which can take a great deal of time. In the end, users can more quickly interact with the augmented reality experiences using physical or manual gestures than having to learn and provide verbal commands that have to be in a predetermined format.

One of the key tasks of conversational AI is Intent+Slot understanding which extracts the utterance objective and details. In most use cases, as conversations have a narrow business focus, this is often implemented by transformer-based neural networks, which train on a large corpus of supervised tagged intents and slots. The large number of different domains covered by augmented reality experiences, and the laborious high effort required to generate the supervised data for each augmented reality experience, causes this task to be highly challenging for augmented reality experience creators to be developed on each specific applicable domain. To address these issues, the disclosed techniques provide a conversation augmented reality system that provides easy to use, generic, and user-engaging interaction that can be applied in various scenarios and domains, including augmented reality experiences and shopping-based augmented reality experiences.

The disclosed techniques improve the efficiency of using the electronic device by providing an augmented reality experience that can be controlled through natural conversational input. For example, the users can verbalize commands (or requests) in a natural conversational form without having to meet stringent predetermined formats for each different augmented reality experience. These verbalized commands can then be processed by the disclosed speech recognition engine to perform modifications to the augmented reality experience that are appropriate for that augmented reality experience. Namely, a natural speech recognition engine or model can process the commands and receive a schema associated with a given augmented reality experience to generate a set of modifications to the augmented reality experience that match the commands received from the user. The commands received from the user need not explicitly mention the components or properties a user seeks to have modified, but based on the schema and other words in the verbalized commands, the speech recognition engine can interpret the commands and determine the appropriate components or properties to modify. As referred to herein, the term "conversation" refers to an experience in which two or more entities (a person/user and a computer; or two persons and a computer) responding to each other's speech in an on-going flow in relation to one or more topics.

Specifically, the disclosed techniques generate, for display by a messaging application, an image that includes one or more augmented reality elements. The one or more augmented reality elements can be associated with a configurable entity. The disclosed techniques receive, by the messaging application, speech input from a user and determine a schema associated with the one or more augmented reality elements. The disclosed techniques cause the speech input to be processed by a speech understanding model, such as a trained neural network, in accordance with the schema to determine one or more configurable state entity update values. The disclosed techniques update the configurable entity associated with the one or more augmented reality elements based on the one or more configurable state entity update values and modify the one or more augmented reality elements in the image based on the updated configurable entity.

In this way, the disclosed techniques provide a much more intuitive, robust, and engaging augmented reality system and avoid having the user learn ahead of time the specific types of commands each different augmented reality experience can accept. This increases the efficiency at which augmented reality experiences can be accessed and interacted with, which reduces the amount of resources needed to generate the augmented reality experiences. Specifically, the disclosed techniques increase efficiencies for end users on the one hand and for augmented reality experience creators on the other. As for end users, such users can provide conversational speech input and interactions to modify or otherwise interact with an augmented reality experience without having to learn a specific set of commands or follow a specific type of protocol for controlling the augmented reality experience. As for augmented reality experience creators, such creators can build a domain specific model (e.g., a conversational controlled augmented reality experience specific to the augmented reality experience being created) without having to collect training data and training a neural network speech understanding model. This is enabled by the disclosed speech recognition system being trained in accordance with a zero shot learning process to respond to new domains (conversational augmented reality experience domains) without being trained on them.

According to the disclosed techniques, the conversation augmented reality experience system allows the user to verbally select, configure, and personalize objects according to the end-user preferences. For example, using the conversation augmented reality system, users can control the augmented reality experience with sentences such as, "Let's replace the current buttons with gold buttons", or "my bunny ears should be more furry" or "can you make my bitmoji look more serious." Moreover, the augmented reality experience designer can be provided with an easy-to-define and work with interface allowing the creators and marketers to integrate the functionality in various domains with minimal effort.

According to the disclosed techniques, the conversation augmented reality experience system provides augmented reality experiences that can be easily enhanced with a conversational canvas, making them interactive and responsive to users' natural language utterances. Augmented reality experience creators can use a conversational canvas to quickly add conversational interfaces for new or existing lenses. According to the disclosed techniques, the central abstraction in the conversation augmented reality experience system is the configurable entity—a data structure with a matrix of objects, properties and a list of possible properties values. The configurable entity represents the state of interactive objects in the augmented reality experience—such as: virtual makeup item to try on, changing AR body shape, initiation of visual effects, and so forth. From the creator's side the configurable entity is a simple stateful data structure that can be plugged into the existing augmented reality experience interactive logic. Once the configurable entity is defined and plugged into the augmented reality experience logic, the conversation augmented reality experience system can map users' utterances into filling the properties of the configurable entity state, thus making the augmented reality experience conversational and responsive to the user's requests in natural language.

The disclosed techniques provide a way to automatically easily generate an effective machine/human conversations focused on the process of exploring alternatives in a purchasing cycle. Such conversations evolve on the selection, configuration, and exploration of alternatives when purchasing items or services.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, watermarks (combined indications of messages and reactions being read or presented to a user of a client device 102) and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocol s.

The API server 116 receives and transmits message data (e.g., watermarks, commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
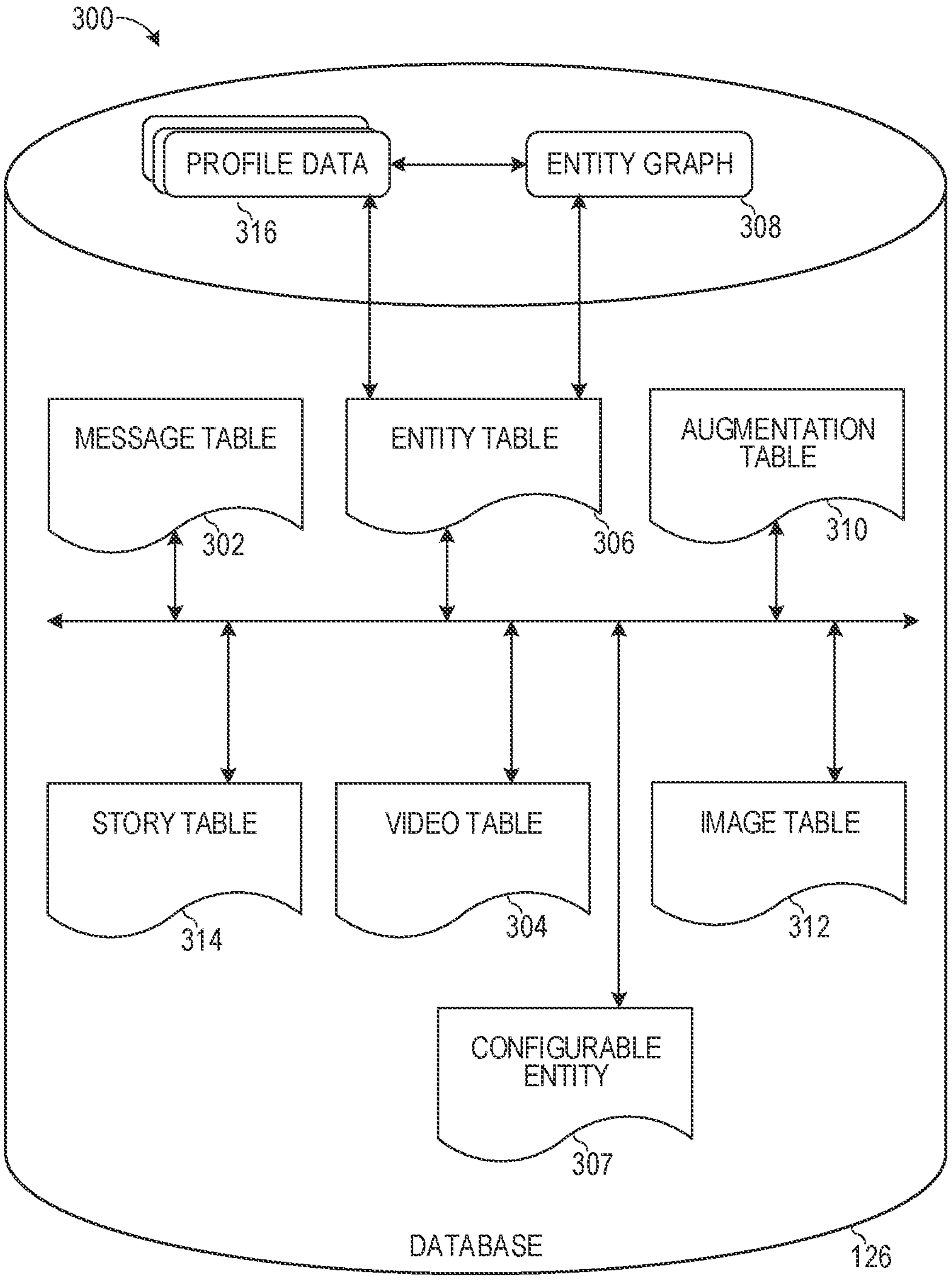
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a. third-party application (external apps 109) installed on the client device 102 (e.g., a "native app"), or a small-scale version of the third-party application (e.g., an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed. external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present an augmented reality experience that can provide speech or conversation-based interactions. For example, the messaging client 104 can capture an image or video of a user (or a 2D or 3D environment), such as using a front-facing camera of the client device 102. The messaging client 104 can overlay or display on the image or video that depicts the user one or more augmented reality graphical elements that make up the augmented reality experience. As an example, the messaging client 104 can display augmented. reality fashion items, such as makeup, clothing, jewelry, hats or glasses. As another example, the messaging client 104 can present an avatar as the augmented reality graphical elements that represents the user. As another example, the messaging client 104 can capture an image or video of an environment that depicts a vehicle. In such cases, the messaging client 104 can receive speech interaction from the user requesting to change a color of the vehicle. In response, the messaging client 104 can display the vehicle with an augmented reality color requested by the speech interaction.

The messaging client 104 can receive speech input from the user (e.g., "Please change the frame to blue") while the augmented reality experience is being presented to the user (e.g., while the augmented reality graphical elements are being displayed on the image that depicts the user). As an example, the speech input can include a request to make a change to the augmented reality graphical elements, such as changing a color of one or more of the augmented reality graphical elements, changing a style, changing a size or shape, changing a material, changing a virtual property (e.g., asking to increase image brightness by a bit or painting a building more vividly), and/or changing an audio attribute of the augmented reality experience. In response to receiving the speech input, the messaging client 104 obtains a schema of the current augmented reality experience that identifies a current state of a configurable entity (e.g., lens type and corresponding property values (transparent and opaque), frame shape and corresponding property values (round and square), frame color and corresponding property values (black, red, yellow)). The current state can specify a list of expected intents and slots and can provide a first set of selections of a list of objects and respective properties of the augmented reality graphical elements of the augmented reality experience (e.g., current lens type is opaque, current frame shape is round, current color is red). The messaging client 104 provides the raw speech input and the schema to a speech understanding model (e.g., a trained neural network).

The speech understanding model processes the raw speech input ("Please change the frames to blue") and the schema to generate an estimated intent(s) and corresponding slot(s). The estimated intent(s) and slot(s) are processed by the speech understanding model together with the current state of a configurable entity (e.g., the first set of selections of the list of objects and respective properties of the augmented reality graphical elements) to generate an update to the configurable entity. For example, the speech understanding model generates a second set of selections of the list of objects and respective properties of the augmented reality graphical elements (set current color to blue) based on the estimated intent(s) and slot(s) and the current schema or current state of the configurable entity. The speech understanding model also generates an audio response (e.g., "here you go") based on the estimated intent(s) and slot(s). The speech understanding model provides the audio response and the update to the configurable entity back to the messaging client 104.

The messaging client 104 processes the updates to the configurable entity to modify the augmented reality graphical elements currently being presented over the depiction of the user in the image. Namely, the messaging client 104 changes the values in the current configurable entity (e.g., the first set of values of the properties of the objects) to the updated values (e.g., a second set of values of the properties of the objects). For example, the messaging client 104 changes a color value of an augmented reality glasses object from a first color to an updated second color (e.g., when the speech input requests a change to a color or brightness of the glasses). The messaging client 104 updates the augmented reality graphical elements based on the updated configurable entity. The messaging client 104 also generates an audio response to the speech input based on the audio response received from the speech understanding model.

System Architecture

Figure 2:
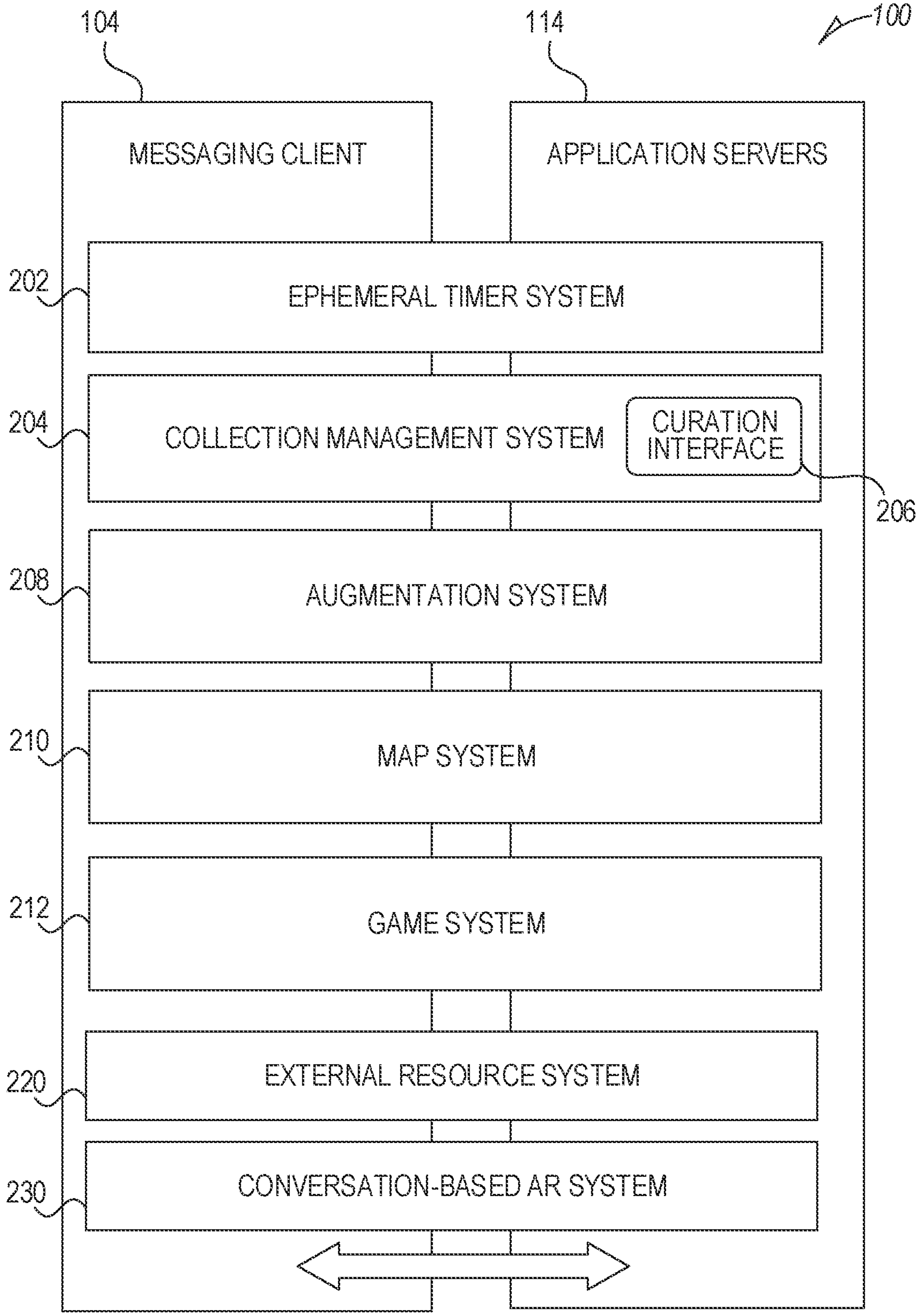
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a conversation-based AR system 230.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking-based features in which one or more augmented reality items are modified based on movement of facial features detected in a received or captured image or video. As another example, the media overlays may include the audio clip-based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to “friends” of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

In some examples, the messaging client 104 can receive conversational or speech input from a user requesting an interaction with the map system 210. The conversational or speech input can request that the messaging client 104 display an image or video of a friend that is on the map. The conversational or speech input can request that a message be sent to a friend that is depicted on the map. In response, the messaging client 104 can process the speech input and send the message to the friend and present an augmented reality element representing the message.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a. leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5)-based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Figure 6B:
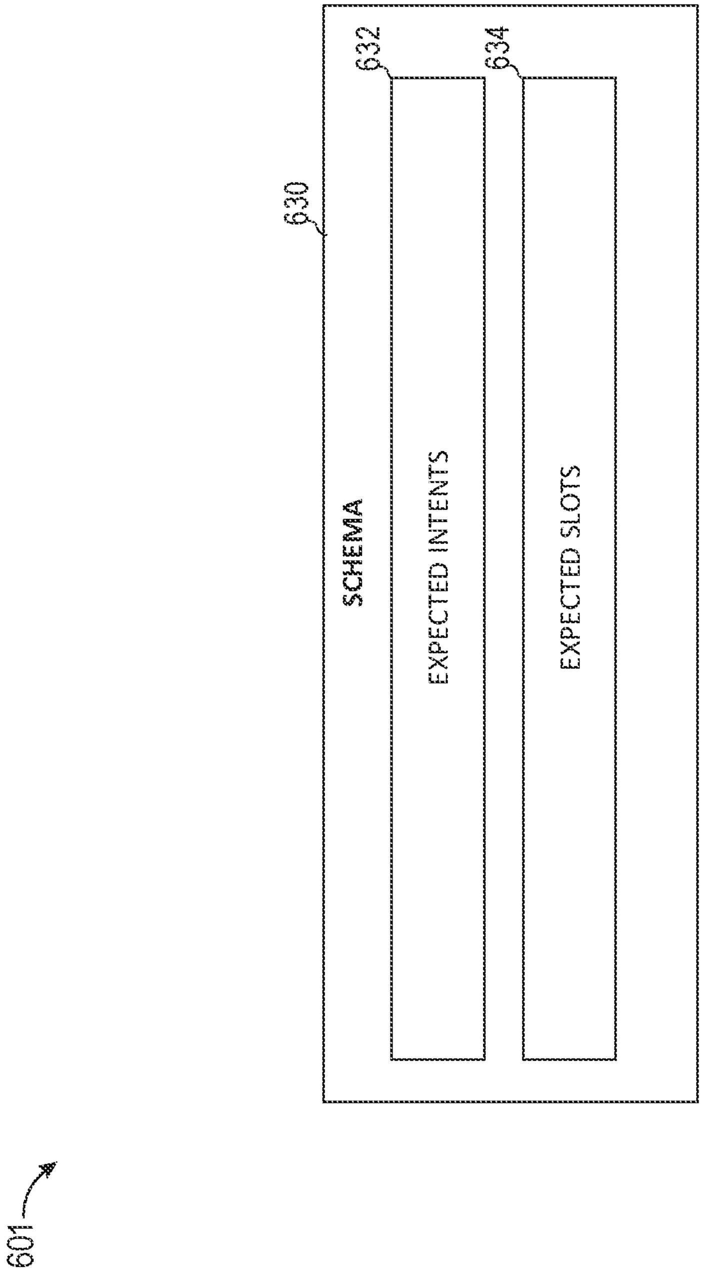

The conversation-based AR system 230 manages conversation interaction between an end user and an augmented reality experience and also enables augmented reality experience designers to generate conversation-based augmented reality experiences. The conversation-based AR system 230 can present a user interface to an augmented reality experience designer. The user interface allows the designer to input one or more configurable entities associated with the augmented reality experience that indicates the various types of alternatives and selections that can be made to the augmented reality experience (e.g., changing audible voice, changing colors and styles of augmented reality elements, changing animation patterns, and so forth). The one or more configurable entities can be stored in a configurable entity 307 data structure 300 in database 126. The one or more configurable entities can include a list of objects e.g., types of augmented reality elements that are presented in the augmented reality experiences) and corresponding property values of each object in the list (e.g., the property values indicate the available selections or changes that can be made to a given Object, such as a color or style). The one or more configurable entities can be converted by the conversation-based AR system 230 to a schema format file 601 (FIG. 6B) that lists the types of intents and slots that can be expected and associated with the one or more configurable entities. The list of types of intents 632 and slots 634 that can be expected can be stored in a schema format 630 shown in FIG. 6B. The one or more configurable entities and schema is stored in association with the augmented reality experience in the database 126.

During training, the conversation-based AR system 230 can train a speech understanding model (e.g., a neural network) based on a plurality of training data (pertaining to a first set of domains—including various speech inputs and various types of schemas and/or one or more configurable entities associated with a first set of augmented reality experience types). During training, the speech understanding model can receive the training speech input and estimate a set of intents and entities based on the first set of domains, such as a schema or one or more configurable entities that is currently selected for training. The estimated set of intents and entities can be converted to corresponding objects and properties of the configurable entity. The estimated intents and entities and/or the estimated objects and properties can be compared to ground-truth or expected intents and entities or objects and properties corresponding to the given speech input and selected schema or configurable entity. A deviation is computed based on the comparison and parameters of the speech understanding model are updated and used to process another set or batch of training data. The speech understanding model continues to be trained in this way until all or various types of schemas and configurable entities are processed together with various speech inputs until a stopping criterion is reached for each type of schema or configurable entity.

After being trained, the conversation-based AR system 230 can receive speech input relating to a new domain (e.g., a new augmented reality experience type) that is different from the first set of domains associated with the training data used to train the conversation-based AR system 230. The conversation-based AR system 230 can process the speech input together with information or context associated with the new domain to estimate a set of intents and entities associated with the new domain. The conversation-based AR system 230 can populate one or more never before seen configurable entities associated with the new augmented reality experience type based on the estimated set of intents and entities. In this way, the conversation-based AR system 230 is trained to generalize speech input across a variety of different domains and augmented reality experience types without being specifically trained on each different type of augmented reality experience. This enables AR creators to seamlessly create new AR experiences that can be controlled using conversational input without having to follow rigid formatting guidelines or training a neural network to process speech associated with the new AR experience type.

As an example, the conversation-based AR system 230 can initially be trained to recognize and generate intents and entities of speech input based on training data associated with a first domain that pertains to a generic glasses try-on AR experience type. The conversation-based AR system 230, after being trained, can receive speech input in association with a second domain that pertains to a garment or fashion try-on AR experience type. Even though the conversation-based AR system 230 was never trained to recognize speech in relation to the garment or fashion try-on AR experience type, the conversation-based AR system 230 can utilize the trained parameters relating to the generic glasses try-on AR experience type to estimate a set of intents and entities for the new garment or fashion try-on AR experience type. These intents and entities can then be used to populate one or more configurable entities associated with the new garment or fashion try-on AR experience type to enable the conversational AR experience for the end user.

In an example, after being trained, the conversation-based AR system 230 allows an end user to access a given augmented reality experience that is associated with a configurable entity. The conversation-based AR system 230 can present a visual indicator to inform the user if the given augmented reality experience is conversation enabled. If so, the conversation-based AR system 230 can accept speech input from the user to navigate through various alternatives or property values of the augmented reality elements of the augmented reality experience that are presented on the client device 102 of the end user. In some cases, the augmented reality elements are presented over a depiction of the user's face as captured by a front or rear-facing camera of the client device 102. In other cases, the augmented reality elements include an avatar or other object that appears over a real-world environment captured by the camera of the client device 102.

The conversation-based AR system 230 receives speech input from the user via the client device 102, such as from a microphone of the client device 102. The conversation-based AR system 230 obtains the configurable entity associated with the current augmented reality experience and generates a schema for the configurable entity. The conversation-based AR system 230 determines the current selections of the configurable entity representing the current property values of each object that is represented in the augmented reality experience. The conversation-based AR system 230 provides the raw speech input and the schema for the configurable entity to the trained speech understanding model. The speech understanding model processes the raw speech input and the schema and generates estimated intents and slots. The estimated intents and slots are further processed by the conversation-based AR system 230 to generate a list of updates to the current configurable entity. Specifically, the conversation-based AR system 230 determines which property values in the configurable entity to change based on the estimated intents and slots. The conversation-based AR system 230 generates a set of updates to the configurable entity and provides such updates to the client device 102. The client device 102 updates the respectively indicated property values in the local configurable entity that is used to control the presentation of the augmented reality experience. In response, the client device 102 reflects those updated property values in the presentation of the augmented reality elements of the augmented reality experience. For example, if the raw speech input requests that ears of an avatar be increased in size, the next higher property value of the ear size object in the configurable entity is selected, such as in response to receiving the update from the conversation-based AR system 230 (e.g., a configurable entity state machine 514 and/or the speech understanding model 516) indicating an instruction to select the next higher size for the ear size object. In an example, the configurable entity state machine 514 controls the selection and change of slot values or property values of the configurable entity. Namely, the configurable entity state machine 514 maintains the current state of the configurable entity and controls the state change and transition from one value to another for each slot value of a corresponding property. As a result, the size of the augmented reality ear objects presented on a display of the client device 102 is increased without changing or affecting any other augmented reality element that is displayed.

Figure 5:
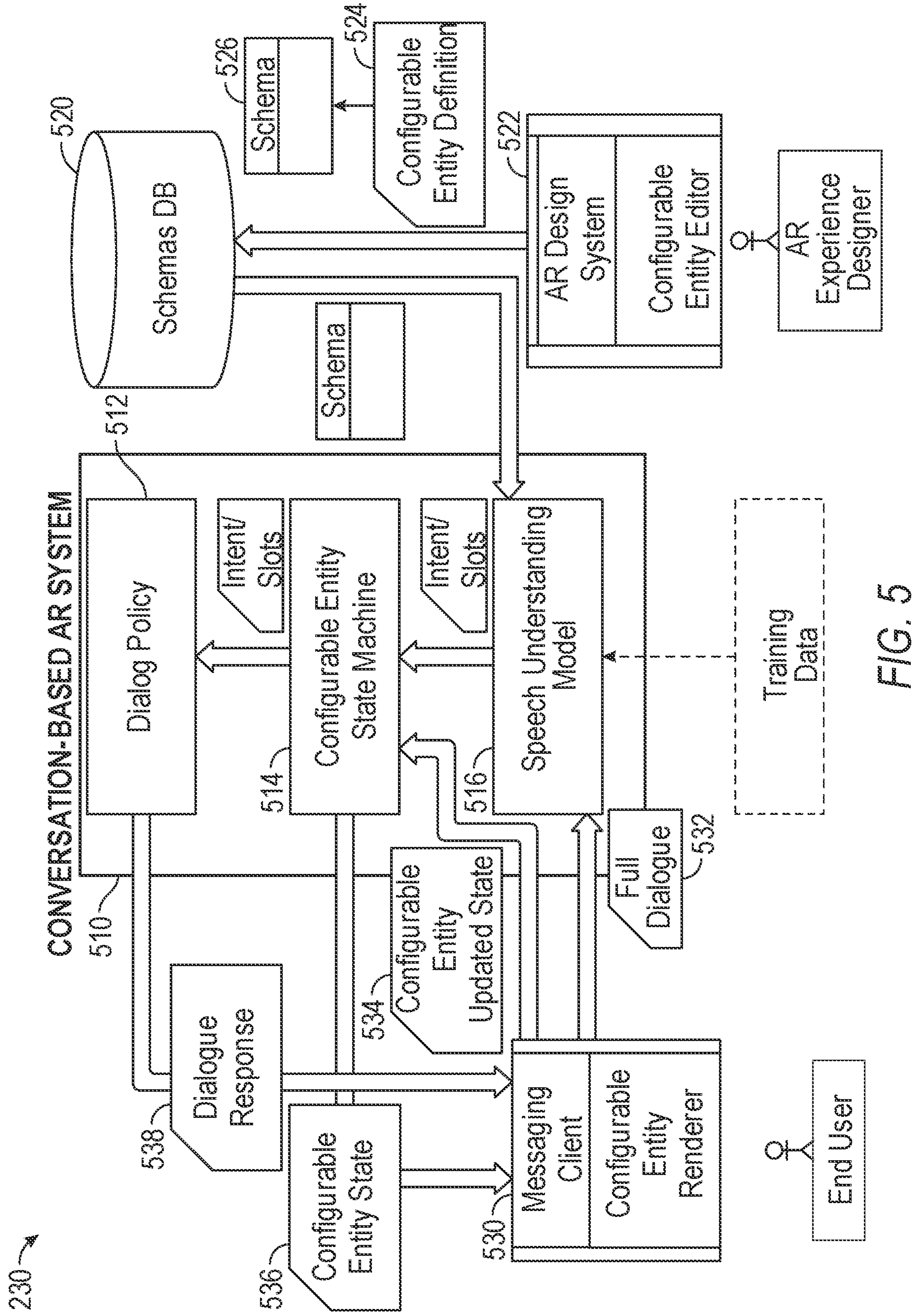
FIG. 5 illustrates the conversation-based AR system, in accordance with some examples.

Further details of the conversation-based AR system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a, sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
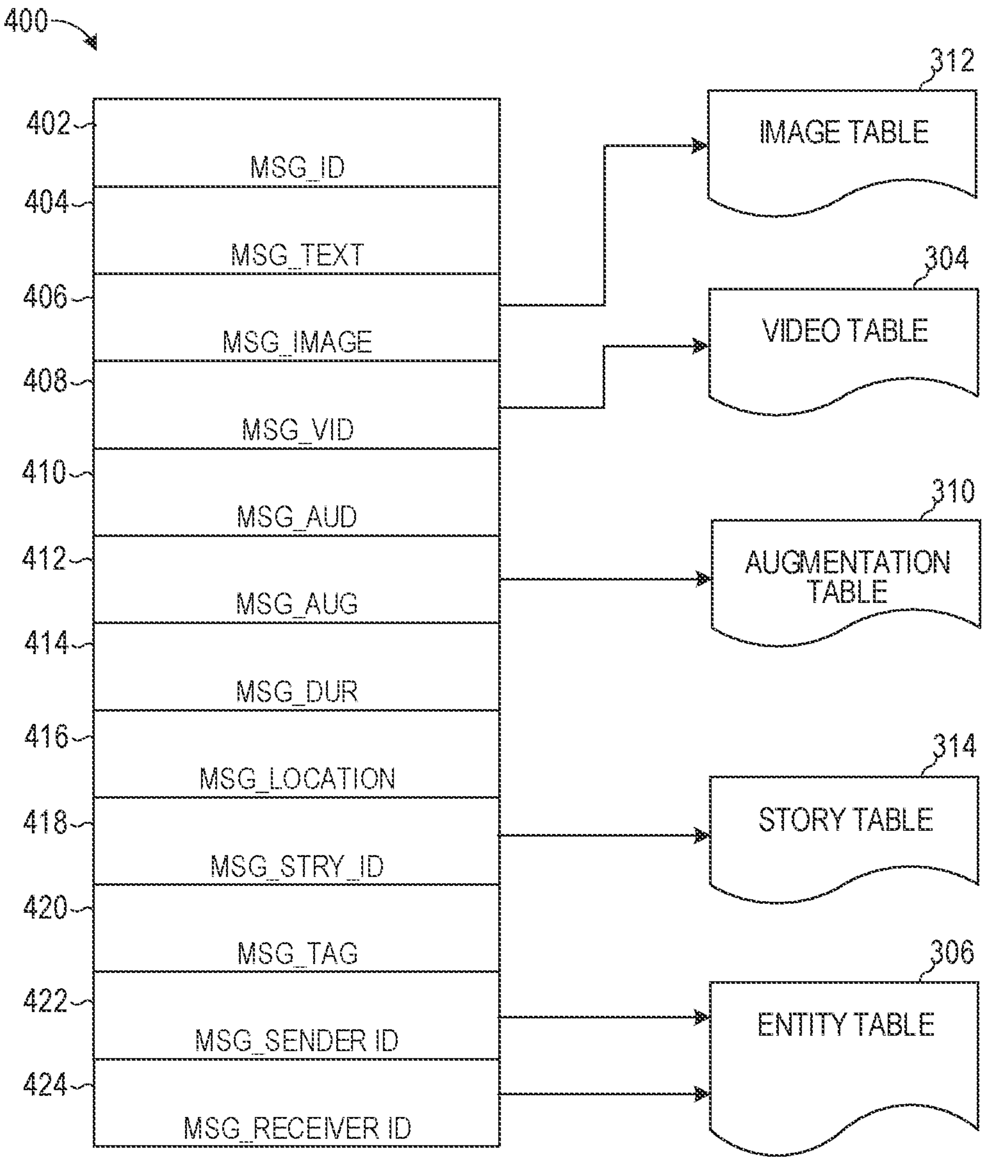
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored. within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.

- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Conversation-Based AR System

FIG. 5 illustrates the conversation-based AR system 230 according to some examples. The conversation-based AR system 230 includes a messaging client 530 (e.g., client device 102), a speech understanding module 510 (e.g., speech understanding model 516), a schemas database 520, and an AR design system 522. While all of the components are drawn as being part of the conversation-based AR system 230, any one or all of the components can be implemented by separate devices and be in geographically disparate locations. As mentioned previously, the conversation-based AR system 230 manages conversation interaction between an end user and an augmented reality experience and also enables augmented reality experience designers to generate conversation-based augmented reality experiences.

In an example, the AR design system 522 (which can be implemented by a client device 102) can present a user interface (e.g., a configurable entity editor) to an augmented reality experience designer. The user interface can receive input from the designer that includes a configurable entity associated with a given augmented reality experience. The input is used to generate a configurable entity definition file 524 that indicates the various types of alternatives and selections that can be made to the augmented reality experience (e.g., changing audible voice, changing colors and styles of augmented reality elements, changing animation patterns, and so forth).

Examples of the configurable entity definition file 524 is shown in FIG. 6A. Specifically, a first configurable entity type 610 can be defined by the configurable entity definition file 524. The first configurable entity type 610 includes a first plurality of objects 612 and a corresponding set of property values 614 associated with each of the first plurality of objects 612. For example, the first plurality of objects 612 can define an augmented reality voice modification experience. The augmented reality voice modification experience can allow a given user to record verbal input and can modify the verbal input based on the set of property values 614 and generate an audible signal that includes the modified verbal input. In such cases, the first plurality of objects 612 includes a pitch object that controls the pitch of the modified verbal input, a gender object that controls the gender of the modified verbal input, a distortion object that controls any distortion applied to the modified verbal input, and a type object that controls a type of verbal modification applied to the verbal input. The pitch object can be associated with a first set of property values, such as high and low; the gender object can be associated with a second set of property values, such as male, female, and/or other values; the distortion object can be associated with a third set of property values, such as alien and squeaky; and the gender object can be associated with a fourth set of property values, such as bass and soprano.

Another example of the configurable entity definition file 524 can include a second configurable entity type 620. The second configurable entity type 620 includes a second plurality of objects 622 and a corresponding set of property values 624 associated with each of the second plurality of objects 622. For example, the second plurality of objects 622 can define an augmented reality experience in which augmented reality glasses are presented over a depiction of a user in a captured image or video. The look and feel of the augmented reality glasses is set based on the set of property values 624. In such cases, the second plurality of objects 622 includes a color object that controls the color of the glasses frame, a lens type object that controls the material quality of the lens of the glasses, a frame shape object that controls the shape of the frames and lenses of the glasses, and a type object that controls a type of the frames. The color object can be associated with a first set of property values, such as different colors including black, red and yellow; the lens object can be associated with a second set of property values, such as transparent and opaque; the frame shape object can be associated with a third set of property values, such as round and square; and the type object can be associated with a fourth set of property values, such as sunglasses and reading glasses.

The configurable entity definition file 524 can be converted by the conversation-based AR system 230 to a schema format 526 that lists the types of intents and slots (or slot values) that can be expected and associated with the configurable entity. The schema format 526 can also list the possible properties or slot values that any slot can receive (similar to configurable entity property values). For example, the schema format 526 can specify a slot for the property "glasses" with possible slot values being different colors, such as red, blue, gold, and so forth. The configurable entity definition file 524 and schema format 526 is stored in association with the augmented reality experience in the schemas database 520 which is accessible to the speech understanding module 510. For example, in case of an augmented reality makeup application experience (in which augmented reality makeup elements are added to a depiction of a user's face in an image or video captured by a camera), the expected intents can include put_mascara; remove_mascara; put_lipstick; and remove_lipstick and slots can include mascara_color and lipstick_color. As an example, if the speech input is "I want to try a dark blue mascara please", the intent can be interpreted to be put_mascara and the slot can be interpreted to be mascara_color.

The conversation-based AR system 230 can train a speech understanding model 516 (e.g., a neural network) based on a plurality of training data (including various speech inputs and various types of schemas and/or configurable entities stored in the schemas database 520). The speech understanding model 516 is trained to establish a relationship between a pair of speech input and schema (or configurable entity) and an intent/slot associated with the pair of speech input and schema (or configurable entity). In some cases, the recognition model 516 is trained to establish a relationship between a pair of speech input and schema (or configurable entity) and an update to the configurable entity (representing changes to one or more property values of one or more objects in the configurable entity).

The training data can include a plurality of speech inputs, schemas or configurable entities and corresponding ground truth updates to the configurable entities. The ground truth updates represent the actual intent of the instructions contained in the speech input for making certain modifications or selections for the augmented reality experience. The speech understanding model 516 can receive speech input and estimate a set of intents and entities based on the schema or configurable entity that is currently selected for training. The estimated set of intents and entities can be converted to corresponding objects and properties of the configurable entity. The estimated intents and entities and/or the estimated objects and properties can be compared to ground-truth or expected intents and entities or objects and properties corresponding to the given speech input and selected schema or configurable entity. A deviation is computed based on the comparison and parameters of the speech understanding model 516 are updated and used to process another set or batch of training data. The speech understanding model 516 continues to be trained in this way until all or various types of schemas and configurable entities are processed together with various speech inputs until a stopping criterion is reached for each type of schema or configurable entity. In some examples, the speech understanding model 516 is trained based on speech inputs of different domains and learns to generate estimated intents and entities of a new domain.

To estimate the intent/slot or the updates to the configurable entity, the speech understanding model 516 (e.g., a neural network or other machine learning model or technique) is initially trained based on the training data. Specifically, the speech understanding model 516 obtains the training data from the database 126 and/or from the schemas database 520. For example, the speech understanding model 516 may access training data including a batch of speech inputs and associated schema type and/or associated configurable entity type along with the ground truth update to the configurable entity or intent/slot information. The update to the configurable entity or intent/slot is used to control the properties of the augmented reality experience. The speech understanding model 516 is trained to predict a configurable entity update or intent/slot by establishing a relationship between pairs of known speech inputs and corresponding schema types and the corresponding known configurable entity updates or intents/slots.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., speech inputs and corresponding schemas or configurable entities) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF), neural networks (NN), matrix factorization, and Support Vector Machines (SVM) tools may be used for estimating configurable entity updates or intent/slots based on speech input and corresponding schema or configurable entity.

The machine-learning algorithms utilize features (e.g., various combinations of speech inputs and schemas) for analyzing the data to generate assessments (e.g., configurable entity updates or intent/slot). A feature is an individual measurable property of a phenomenon being observed. The concept of a feature is related to that of an explanatory variable used in statistical techniques such as linear regression. Choosing informative, discriminating, and independent features is important for effective operation in pattern recognition, classification, and regression. Features may be of different types, such as numeric features, strings, and graphs.

The machine-learning algorithms utilize the training data to find correlations among the identified features that affect the outcome or assessment (e.g., the known or assigned configurable entity update or intent/slot). In some example embodiments, the training data includes labeled data, which is known data for one or more identified features and one or more outcomes, such as the assigned. configurable entity update or intent/slot.

Once the training data are collected and processed, the speech understanding model 516 can be built using either statistical learning or machine learning techniques. In one embodiment, regression analysis can be used to build the speech understanding model 516. Regression analysis is a statistical process for estimating the relationships among variables. There are a number of known methods to perform regression analysis. Linear regression or ordinary least squares regression, among others, are "parametric" in that the regression function is defined in terms of a finite number of unknown model parameters that can be estimated from training data. For example, a regression model (e.g., Equation 1) can be defined, for example, as:

$$H \approx f(X,\beta), \quad \text{(Equation 1)}$$

where "H" denotes the known configurable entity update or intent/slot, "X" denotes a vector of input variables (e.g., pairs of batches of speech inputs and corresponding schema types or configurable entity types), and "β" denotes a vector of unknown parameters to be determined or trained for the regression model.

The training data that include pairs of batches of speech inputs and corresponding schema types or configurable entity types and the corresponding configurable entity update or intent/slot (which can be manually or automatically specified for each user) provide a set of known H values having corresponding X values (e.g., feature vectors extracted from the pairs of batches of speech inputs and corresponding schema types or configurable entity types). Using these data, the model parameter β can be computed using data fitting techniques such as least squares, maximum likelihood, or the like. Once is estimated, the model can then compute H (e.g., a configurable entity update or intent/slot) for a new set of X values (e.g., feature vectors extracted from a new pair of speech input and schema type or configurable entity type).

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into ii groups and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it is has not been trained. In a second example, a false positive rate or false negative rate may be used to evaluate the models after finalization. In a third example, a delineation between data clusterings is used to select a model that produces the clearest bounds for its clusters of data.

After being trained, the machine learning technique is provided to speech understanding module 510, such as the speech understanding model 516. In one example, the coefficient values of the machine learning technique (e.g., the linear model) are stored in a storage of speech understanding model 516. The speech understanding model 516 is configured to receive new verbal speech input (e.g., dialogue) and a configurable entity state or schema and generate an update to the configurable entity state and/or intent/slot.

Specifically, after being trained, the conversation-based AR system 230 allows an end user to access a given augmented reality experience on a messaging client 530 that is associated with a configurable entity. The conversation-based AR system 230 can present a visual indicator to inform the user if the given augmented reality experience is conversation enabled. If so, the conversation-based AR system 230 can accept speech input from the user to navigate through various alternatives or property values of the augmented reality elements of the augmented reality experience that are presented on the messaging client 530 of the end user. In some cases, the augmented reality elements are presented over a depiction of the user's face as captured by a front or rear-facing camera of the client device 102. In other cases, the augmented reality elements include an avatar or other object that appears over a real-world environment captured by the camera of the client device 102.

The conversation-based AR system 230 receives speech input 532 from the user via the messaging client 530, such as from a microphone of the client device 102. The conversation-based AR system 230 obtains the current configurable entity 534 associated with the current augmented reality experience and generates a schema for the configurable entity 534. The conversation-based AR system 230 determines the current selections of the configurable entity 534 representing the current property values of each object that is represented in the augmented reality experience. For example, if the augmented reality experience presents augmented reality glasses on a depiction of the user's face, the configurable entity 534 indicates the type of glasses, the frame color, and/or the lens type.

The conversation-based AR system 230 provides the raw speech input 532 (e.g., "please change them to blue") and the schema for the configurable entity 534 to the trained speech understanding model 516. In some examples, the speech understanding model 516 includes two stages. A first stage of the speech understanding model 516 converts the raw speech input 532 into text (if not already done so by the client device 102 or another system component). A second stage of the speech understanding model 516 performs natural language processing to map the text associated with the speech input into the corresponding intents and slots (or slot values). Specifically, the speech understanding model 516 processes the raw speech input 532 and the schema for the configurable entity 534 and generates estimated intents and slots (e.g., change_glasses_frames; and set_color). The estimated intents and slots are further processed by the conversation-based AR system 230, such as by the configurable entity state module 514 to generate a list of updates to the current configurable entity state 536. Specifically, the configurable entity state module 514 determines which property values in the configurable entity 534 to change based on the estimated intents and slots. In this case, the configurable entity state machine 514 changes the current glasses frame color to blue.

The conversation-based AR system 230 generates a set of updates to the configurable entity and provides such updates to the messaging client 530. The messaging client 530 updates the respectively indicated property values in the local configurable entity that is used to control the presentation of the augmented reality experience. In response, the messaging client 530 reflects those updated property values in the presentation of the augmented reality elements of the augmented reality experience. For example, if the raw speech input 532 requests that ears of an avatar be increased in size, the next higher property value of the ear size object in the configurable entity is selected, such as in response to receiving the update from the conversation-based AR system 230 indicating an instruction to select the next higher size for the ear size object. As a result, the size of the augmented reality ear objects presented on a display of the messaging client 530 is increased without changing or affecting any other augmented reality element that is displayed.

The conversation-based AR system 230 also processes the intents/slots provided by the speech understanding model 516 with a dialog policy module 512. The dialog policy module 512 generates a suitable verbal response 538 associated with the intents/slots. The verbal response 538 is provided to the messaging client 530 and is used to generate an audible signal that contains the verbal response to the speech input 532.

In this way, the disclosed techniques improve a product purchase experience for a user. Specifically, the conversation-based AR system 230 provides a new conversation type that enables a user to explore and evaluate product alternatives in a seamless and natural conversation flow. Once a user is satisfied with a given product alternative that is presented in AR, the user can speak a request to purchase the corresponding product. In a natural conversational flow, the user can speak interest or disinterest in a given alternative of a product shown in AR to the user. The conversation-based AR system 230 automatically and responsive to the spoken interest or disinterest, obtains a new alternative of the product or reverts to a previous alternative that was presented to the user in AR. This process continues until the user is satisfied and completes a purchase transaction. The user can also speak a command to view all of the different alternatives that were presented to the user in AR, and in response the conversation-based AR system 230 obtains screenshots, images or videos of each alternative of the product that was presented in AR to the user together with the user's face (for example). The conversation-based AR system 230 can generate a mosaic where each alternative that was explored by the user is presented over the user's face simultaneously in a different region of a display. In this way, a first alternative of a product is overlayed on a user's face and is presented in a first image in one region of the display and a second alternative of the same product is overlayed on the user's face and is presented together with the first image in a second image in a second region of the display. The user can verbally speak a command that identifies one of the alternatives in the mosaic to complete a purchase transaction for that alternative.

Figure 7A:
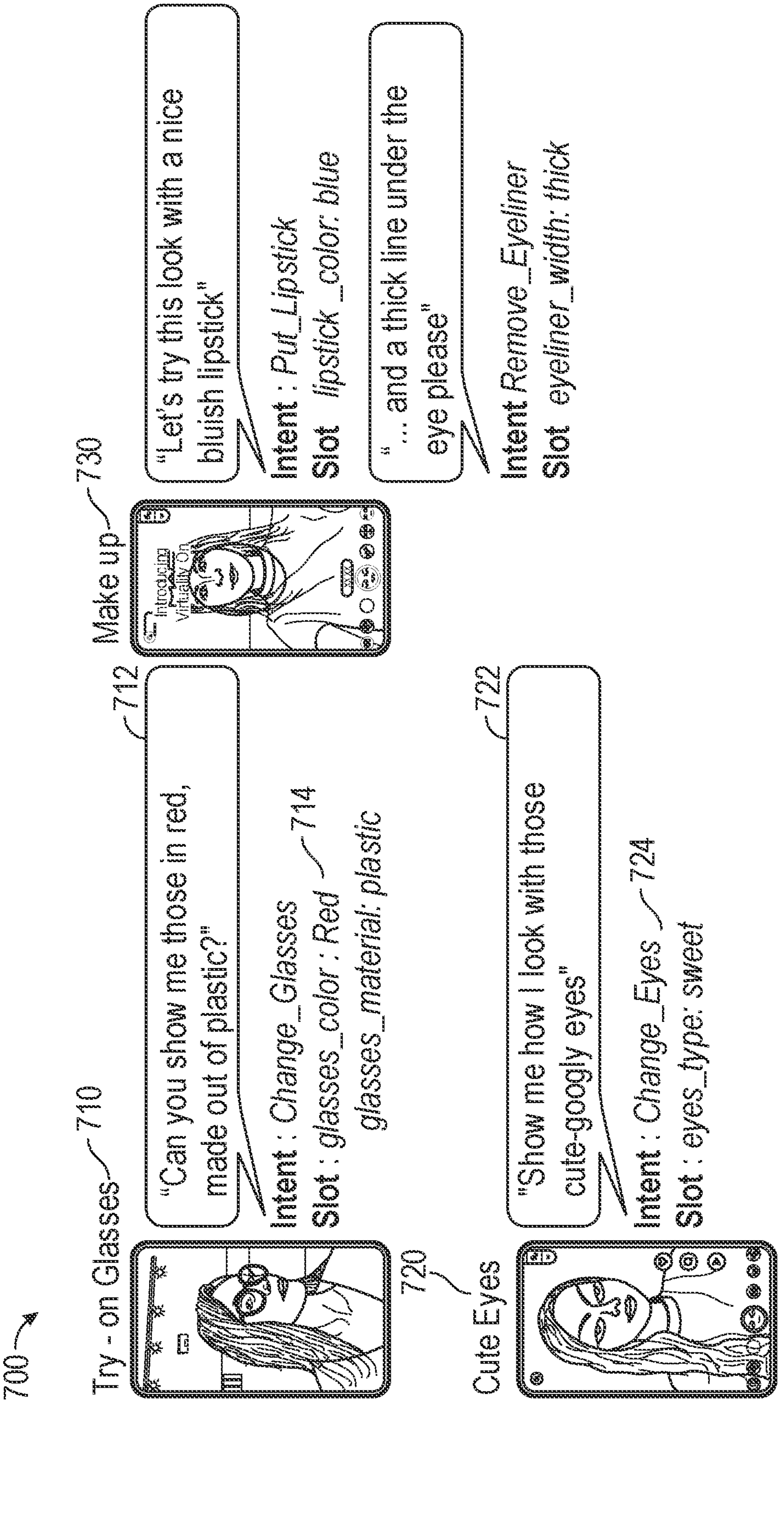
FIGS. 7A and 7B are diagrammatic representations of graphical user interfaces of the conversation-based AR system, in accordance with some examples.

FIG. 7A is a diagrammatic representation of various example graphical user interfaces 700 of the conversation-based AR system 230, in accordance with some examples. A first graphical user interface 710 represents a conversation-based glasses augmented reality experience. In this experience, augmented reality glasses are presented over a depiction of a user's face in an image received from a camera of the client device 102. In this case, the messaging client 104 can receive speech input 712 from the user. The speech input 712 can specify "can you show me those in red, made out of plastic?" The conversation-based AR system 230 processes the speech input 712 together with a schema (e.g., objects and properties associated with a wearables augmented reality experience) and generates a set of intent/slots. As an example, the generated intents/slots includes a change_glasses intent and a glasses_color: red and glasses_material: plastic slot. The conversation-based AR system 230 uses these intents/slots to generate an update to the configurable entity associated with the conversation-based glasses augmented reality experience, such as changing a property value of the frame color object to red and the property value of the frame material to plastic. This change is then reflected in the updated graphical user interface 710 shown to the user, such as by changing the color and material of the augmented reality glasses shown in the graphical user interface 710.

Figure 7B:
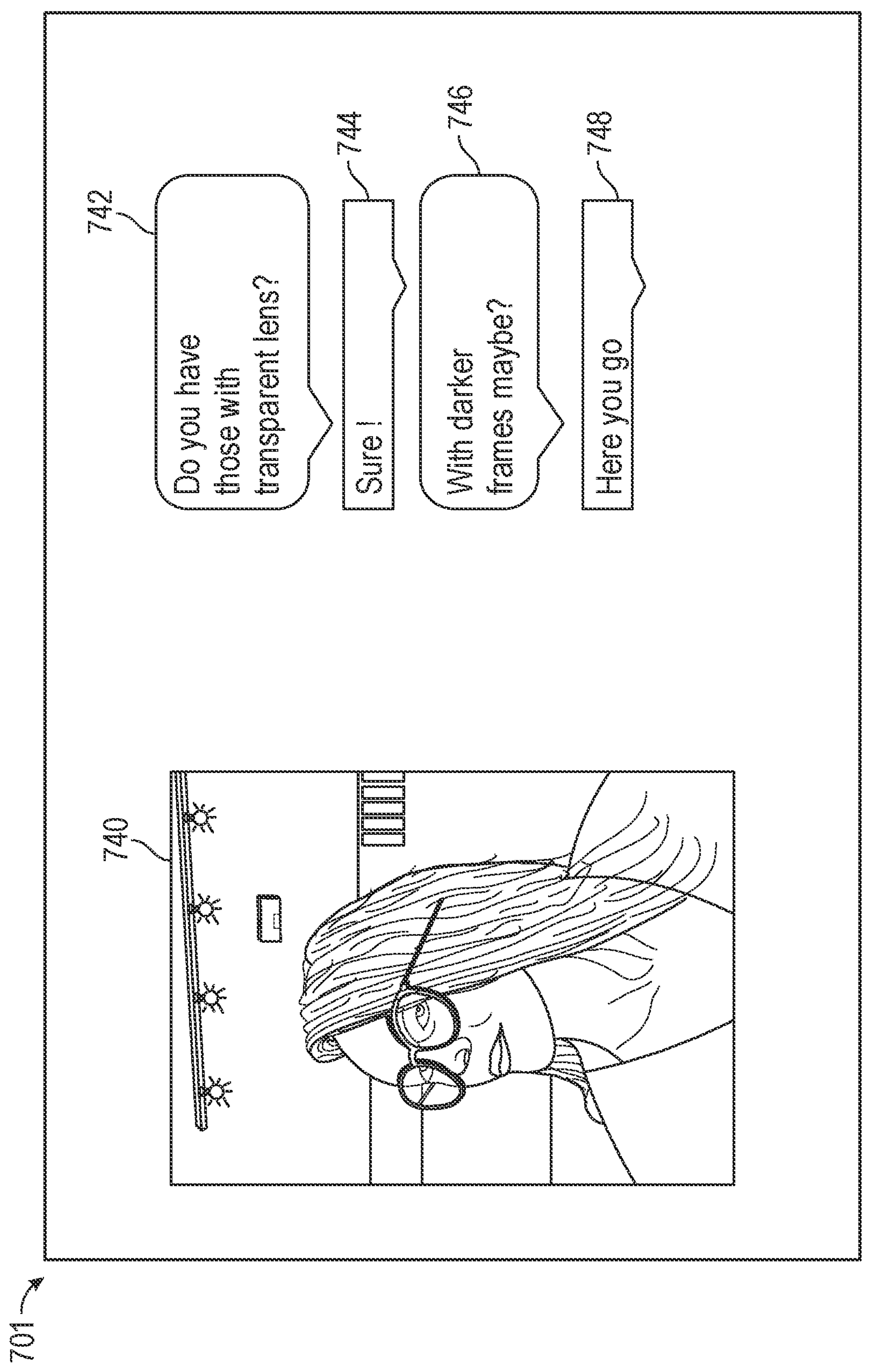

FIG. 7B provides a more detailed example 701 of the conversation-based glasses augmented reality experience discussed in connection with the first graphical user interface 710. As shown, a graphical user interface 740 is provided in which augmented reality glasses are presented over a depiction of a user's face in an image received from a camera of the client device 102. The messaging client 104 can receive speech input 742 from the user. The speech input 742 can specify "do you have those with transparent lenses?" The conversation-based AR system 230 processes the speech input 742 together with a schema (e.g., objects and properties associated with a wearables augmented reality experience) and generates a set of intent/slots. As an example, the generated intents/slots includes a change glasses intent and a glasses_lenses: transparent slot. The conversation-based AR system 230 uses these intents/slots to generate an update to the configurable entity associated with the conversation-based glasses augmented reality experience, such as changing a property value of the lens object to transparent. This change is then reflected in an updated graphical user interface shown to the user. Also, an automated response 744 is generated based on the generated intent/slot and is audibly presented to the user.

A second speech input 746 is subsequently received from the user after presenting the updated graphical user interface to the user. The second speech input 746 can specify "with darker frames maybe?" The second speech input 746 does not specify the schema or indication of the augmented reality experience. The conversation-based AR system 230 processes the second speech input 746 together with a determined schema (e.g., objects and properties associated with a wearables augmented reality experience) and generates a second set of intent/slots. As an example, the generated intents/slots includes a change_glasses intent and a glasses_frames: darker color for the slot value. The conversation-based AR system 230 uses these intents/slots to generate an update to the configurable entity associated with the conversation-based glasses augmented reality experience, such as changing a property value of the frame color object to darker (increments a current property value to the next higher or lower property value). This change is then reflected in a further updated graphical user interface shown to the user. Also, another automated response 748 is generated based on the generated intent/slot and is audibly presented to the user.

Referring back to FIG. 7A, a second graphical user interface 720 represents an avatar-based augmented reality experience. In this experience, an augmented reality avatar is presented on a display of the client device 102. The augmented reality avatar is associated with a configurable entity that includes a plurality of objects and respective properties, such as eye color, eye size, ear size, hair color, hair type, gender, and so forth. The messaging client 104 can receive speech input 722 from the user. The speech input 722 can specify "show me how I look with those cute-googly eyes?" The conversation-based AR system 230 processes the speech input 722 together with a schema (e.g., objects and properties associated with an avatar augmented reality experience) and generates a set of intent/slots. As an example, the generated intents/slots 724 includes a change eyes intent and eyes_type:sweet slot. The conversation-based AR system 230 uses these intents/slots 724 to generate an update to the configurable entity associated with the avatar-based augmented reality experience, such as changing a property value of the eye type object to sweet. In this case, the conversation-based AR system 230 generated a property value that was not explicitly mentioned in the speech input 722 but was inferred as being associated with one or more words in the speech input (e.g., cute-googly). This change is then reflected in the updated graphical user interface 720 shown to the user, such as by changing the shape and style of the eyes shown in the graphical user interface 720.

A third graphical user interface 730 represents a makeup application augmented reality experience. In this experience, augmented reality makeup elements are presented over a depiction of the user's face in an image on a display of the client device 102. The messaging client 104 can receive speech input from the user, such as "let's try this look with a nice bluish lipstick?" The conversation-based AR system 230 processes the speech input together with a schema (e.g., objects and properties associated with a makeup augmented reality experience) and generates a set of intent/slots (e.g., put_lipstick and lipstick_color:blue slot). The conversation-based AR system 230 uses these intents/slots to generate an update to the configurable entity associated with the makeup application augmented reality experience, such as changing a property value of the lipstick object presented on a lips region of the face to blue.

The third graphical user interface 730 represents a conversation-based augmented reality experience that includes one or more augmented reality elements, such as different types of makeup. The conversation-based augmented reality experience enables the user to explore alternatives for the one or more augmented reality elements, such as to request various changes to the makeup that is virtually being applied (e.g., changing lipstick colors). In this example, a first augmented reality element is displayed in the conversation-based augmented reality experience, such as lipstick in a first color. Conversational input from the user is received to explore an alternative for the first augmented reality element, such as a request to change the lipstick color to a darker color. The conversation-based augmented reality experience replaces the first augmented reality element with a second augmented reality element in response to receiving the conversational input from the user, such as by selecting and presenting lipstick in a second color that is a darker shade of the first color. The conversation-based augmented reality experience generates an audible response to the conversational input, such as asking the user if they are happy with the changes. The conversation-based augmented reality experience enables a purchase transaction for an item associated with the conversation-based augmented reality experience in response to additional conversational input, such as by allowing the user to place an order for lipstick to be physically delivered to the user in the color that is currently being presented to the user virtually.

Figure 8:
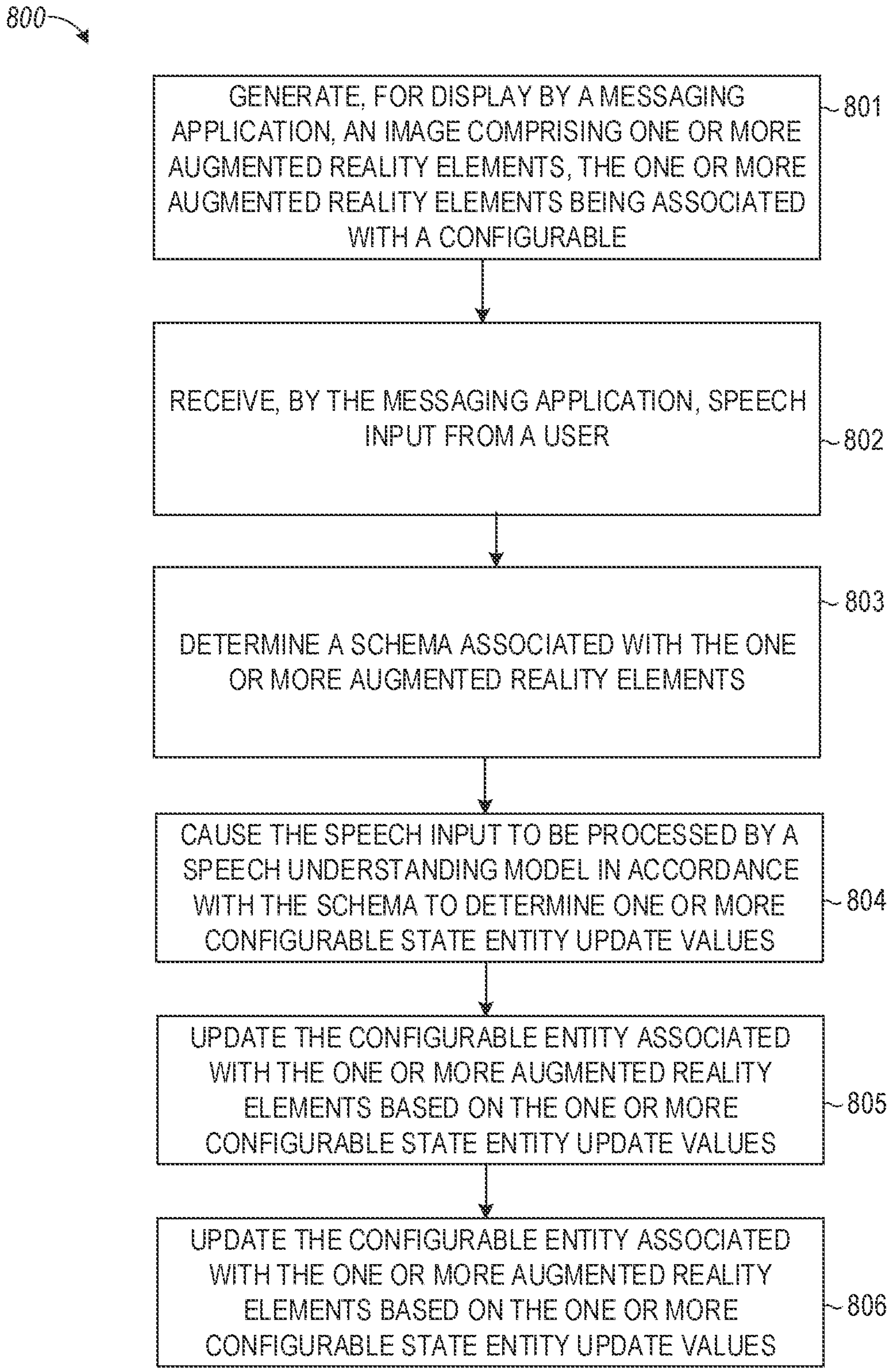
FIG. 8 is a flowchart illustrating example operations of the conversation-based AR system, according to example examples.

FIG. 8 is a flowchart illustrating example operations of the messaging client 104 in performing process 800, according to example examples. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other examples at least some of the operations of the process 800 may be deployed on various other hardware configurations. The operations in the process 800 can be performed in any order, in parallel, or may be entirely skipped and omitted.

At operation 801, the messaging client 104 generates, for display by a messaging application, an image comprising one or more augmented reality elements, the one or more augmented reality elements being associated with a configurable entity, as discussed above.

At operation 802, the messaging client 104 receives speech input from a user, as discussed above.

At operation 803, the messaging client 104 determines a schema associated with the one or more augmented reality elements, as discussed above.

At operation 804, the messaging client 104 causes the speech input to be processed by a speech understanding model in accordance with the schema to determine one or more configurable state entity update values, as discussed above.

At operation 805, the messaging client 104 updates the configurable entity associated with the one or more augmented reality elements based on the one or more configurable state entity update values, as discussed above.

At operation 806, the messaging client 104 modifies the one or more augmented reality elements in the image based on the updated configurable entity, as discussed above.

Machine Architecture

Figure 9:
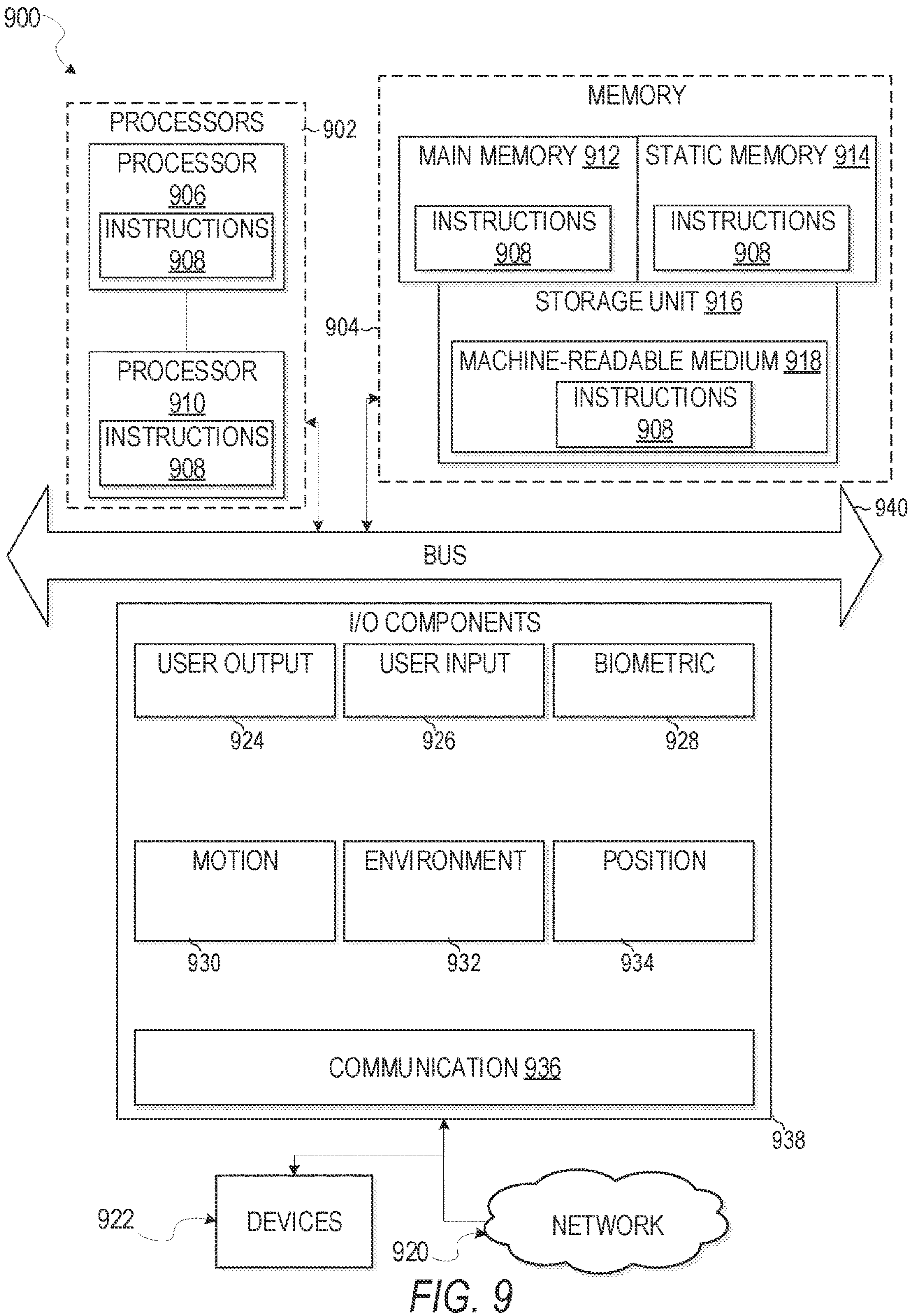
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (SIB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 912, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components. Near Field Communication (NFC) components, Bluetooth® components (e.g., Bluetooth®Low Energy), WiFi® components, and other communication components to provide communication via other modalities. The devices 922 may be another machine or any of a wide variety of peripheral devices e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NEC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
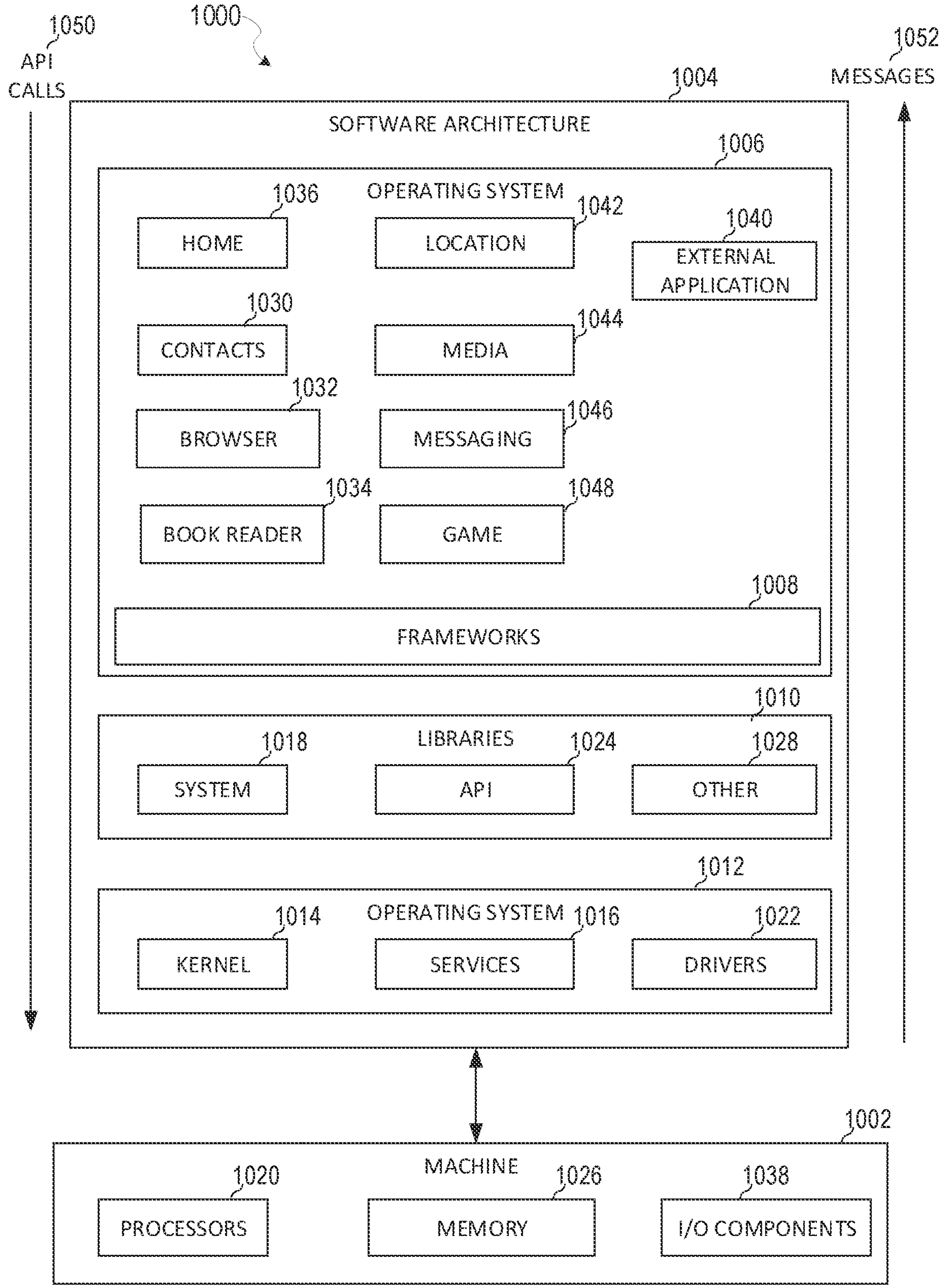
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced. Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultra:books, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTI), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:

generating, for display by a messaging application, an image comprising one or more augmented reality elements, the one or more augmented reality elements being associated with a configurable entity;

receiving, by the messaging application, speech input from a user;

determining a schema associated with the one or more augmented reality elements, the schema comprising types of intents and possible slot values associated with the one or more augmented reality elements;

retrieving from the schema a list of possible slot values associated with an intent corresponding to the speech input received from the user;

causing the speech input to be processed by a speech understanding model in accordance with the schema to determine one or more configurable state entity update values selected from the list of possible slot values;

updating the configurable entity associated with the one or more augmented reality elements based on the one or more configurable state entity update values; and modifying the one or more augmented reality elements in the image based on the updated configurable entity.

2. The method of claim 1, further comprising receiving input that defines the configurable entity for the one or more augmented reality elements;

processing the configurable entity to convert the configurable entity into a schema format; and associating the schema with the one or more augmented reality elements based on the schema format into which the configurable entity was converted.

3. The method of claim 1, wherein the one or more augmented reality elements are initially displayed with a first visual property and are modified to be displayed with a second visual property based on the updated configurable entity.

4. The method of claim 1, wherein the list of possible slot values comprises an identification of possible colors for the one or more augmented reality elements.

5. The method of claim 1, wherein the one or more augmented reality elements correspond to one or more avatar components, wherein the speech input comprises a word or phrase associated with modifying the one or more avatar components, and wherein the one or more avatar components are modified in response to modifying the one or more augmented reality elements in the image based on the updated configurable entity.

6. The method of claim 1, wherein the configurable entity associated with the one or more augmented reality elements comprises a plurality of objects and a plurality of properties associated with the plurality of objects, wherein updating the configurable entity comprises:

identifying a first object and a corresponding first property value from the one or more configurable state entity update values;

matching the first object to a given one of the plurality of objects; and setting a given property of the plurality of properties associated with the first object to the first property value.

7. The method of claim 6, further comprising:

identifying a second object and a corresponding second property value from the one or more configurable state entity update values;

matching the second object to a second one of the plurality of objects; and setting a second property of the plurality of properties associated with the second object to the second property value.

8. The method of claim 6, wherein the speech input excludes explicit mention of the first object or the given property.

9. The method of claim 1, further comprising:

receiving data from an augmented reality experience designer that defines visual behavior of the one or more augmented reality elements associated with an augmented reality experience, the data comprising the configurable entity associated with the one or more augmented reality elements, configurable entity comprising a plurality of objects and a plurality of properties associated with the plurality of objects.

10. The method of claim 1, wherein the speech understanding model is configured to:

detect an intent and slot of the speech input; and generate the configurable state entity update values by matching the intent and slot to object and property values.

11. The method of claim 1, further comprising exploring alternative values of the one or more augmented reality elements based on the speech input received from the user.

12. The method of claim 1, further comprising:

obtaining a list of objects and respective properties associated with the schema; and providing the list of objects and the respective properties to the speech understanding model to generate updates to subsets of the objects and the respective properties based on the speech input.

13. The method of claim 1, wherein the speech understanding model comprises a neural network, further comprising training the neural network based on a plurality of training speech inputs each associated with one of a plurality of different domains or classifications.

14. The method of claim 13, wherein the trained neural network estimates updates to the type of configurable entity for a new domain or classification of speech input different from the plurality of different domains or classifications.

15. The method of claim 13, further comprising training the neural network in accordance with a zero-shot learning process by performing training operations comprising:

accessing the plurality of training speech inputs, training schemas, and corresponding ground truth updates to training configurable entities, the ground truth updates representing actual intent of instructions contained in the plurality of training speech inputs for making modifications to corresponding augmented reality experiences;

receiving a set of training speech inputs of the plurality of training speech inputs;

processing the set of training speech inputs by the neural network to estimate a set of intents and entities based on the training schema associated with the set of training speech inputs;

converting the estimated set of intents and entities to corresponding estimated objects and properties of the training configurable entity associated with the training schema;

computing a deviation based on comparison of the estimated intents and entities and the estimated objects and properties to the ground truth updates to the training configurable entity associated with the training schema; and updating one or more parameters of the neural network based on the computed deviation.

16. The method of claim 13, wherein:
the neural network comprises a schema guided dialogue model;
a first configurable entity corresponding to a new domain or classification represents a first type of augmented reality experience corresponding to an avatar representation of a given user, configurable entity updates associated with the first configurable entity represent changes to a size and color of various components of the avatar representation; and
a second configurable entity corresponding to the new domain or classification represents a second type of augmented reality experience corresponding to display of a fashion item on top of a user depiction in an image, configurable entity updates associated with the second configurable entity represent changes to a size and color of the fashion item.

17. The method of claim 1, further comprising:
generating a conversation-based augmented reality experience comprising the one or more augmented reality elements, the conversation-based augmented reality experience enabling the user to explore alternatives for the one or more augmented reality elements;
generating, for display, a first augmented reality element in the conversation-based augmented reality experience;
receiving conversational input from the user to explore an alternative for the first augmented reality element;
replacing the first augmented reality element with a second augmented reality element in response to receiving the conversational input from the user;
generating an audible response to the conversational input; and
enabling a purchase transaction for an item associated with the conversation-based augmented reality experience in response to additional conversational input.

18. The method of claim 1, wherein determining the schema comprises accessing metadata associated with the one or more augmented reality elements to obtain a first selection of objects and respective properties associated with the one or more augmented reality elements, wherein the updated configurable entity comprises a second selection of the objects and respective properties associated with the one or more augmented reality elements.

19. A system comprising:
at least one processor of a device configured to perform operations comprising:
generating, for display by a messaging application, an image comprising one or more augmented reality elements, the one or more augmented reality elements being associated with a configurable entity;
receiving, by the messaging application, speech input from a user;
determining a schema associated with the one or more augmented reality elements, the schema comprising types of intents and possible slot values associated with the one or more augmented reality elements;
retrieving from the schema a list of possible slot values associated with an intent corresponding to the speech input received from the user;
causing the speech input to be processed by a speech understanding model in accordance with the schema to determine one or more configurable state entity update values selected from the list of possible slot values;
updating the configurable entity associated with the one or more augmented reality elements based on the one or more configurable state entity update values; and
modifying the one or more augmented reality elements in the image based on the updated configurable entity.

20. A non-transitory machine-readable storage medium that includes instructions that, when executed by one or more processors of a client device, cause the client device to perform operations comprising:
generating, for display by a messaging application, an image comprising one or more augmented reality elements, the one or more augmented reality elements being associated with a configurable entity;
receiving, by the messaging application, speech input from a user;
determining a schema associated with the one or more augmented reality elements, the schema comprising types of intents and possible slot values associated with the one or more augmented reality elements;
retrieving from the schema a list of possible slot values associated with an intent corresponding to the speech input received from the user;
causing the speech input to be processed by a speech understanding model in accordance with the schema to determine one or more configurable state entity update values selected from the list of possible slot values;
updating the configurable entity associated with the one or more augmented reality elements based on the one or more configurable state entity update values; and
modifying the one or more augmented reality elements in the image based on the updated configurable entity.

* * * * *